United States Patent
Mayer et al.

[11] 3,767,569
[45] Oct. 23, 1973

[54] HYDRODESULFURIZATION OF HYDROCARBON RESIDUUM WITH CATALYTIC OIL-SLURRY AND FIXED-BED ZONES

[76] Inventors: Francis X. Mayer, 5277 Whitehaven St., Baton Rouge, La. 70808; Karsten H. Moritz, 114 Goltra, Basking Ridge, N.J. 07920

[22] Filed: Dec. 10, 1971

[21] Appl. No.: 206,816

[52] U.S. Cl. .............................. 208/210, 208/211
[51] Int. Cl. ............................................ C10g 23/02
[58] Field of Search ............... 208/211, 210, 251 H, 208/212, 216

[56] References Cited
UNITED STATES PATENTS

| | | | |
|---|---|---|---|
| 2,771,401 | 11/1956 | Shepherd | 208/210 |
| 3,530,066 | 9/1970 | Kuwata | 208/210 |
| 3,297,563 | 1/1967 | Doumani | 208/210 |
| 3,536,607 | 10/1970 | Borst, Jr. | 208/215 H |
| 3,471,398 | 10/1969 | Borst, Jr. | 208/210 |
| 3,622,495 | 11/1971 | Gatsis et al. | 208/251 H |
| 3,663,434 | 5/1972 | Bridge | 208/210 |
| 3,362,901 | 1/1968 | Szepe et al. | 208/210 |
| 3,530,066 | 9/1970 | Kuwata et al. | 208/210 |
| 3,563,887 | 2/1971 | Fraser et al. | 208/216 |
| 3,720,602 | 3/1973 | Riley et al. | 208/216 |

Primary Examiner—Delbert E. Gantz
Assistant Examiner—G. J. Crasanakis
Attorney—Leon Chasan et al.

[57] ABSTRACT

A process for hydrorefining, particularly, hydrodesulfurizing a hydrocarbon feedstock containing relatively high quantities of sulfur, asphaltenes, metals and ash by use of a slurry type of heat treater operated in advance of the hydrodesulfurization reactor. A catalyst is present in the heat treater in an oil slurry wherein the feedstock is desalted and demetallized and then transferred to the main reactor. The system is primarily a sulfur removal operation and hydrocarbon conversion is at a minimum.

13 Claims, 4 Drawing Figures

HYDRODESULFURIZATION OF HYDROCARBON RESIDUUM WITH CATALYTIC OIL-SLURRY AND FIXED-BED ZONES

BACKGROUND OF THE INVENTION

1. Field of the Invention

This invention relates to the hydrorefining of petroleum feedstocks, and more particularly to the catalytic hydrodesulfurization of petroleum feedstocks containing contaminants which occur in the form of inorganic metal salts, caustic and the like and to eliminating the plugging of a catalytic reactor by contaminants.

2. Description Of The Prior Art

In the conversion of hydrocarbon oils with oxide catalysts and particularly activated metal oxides of the type containing alumina and/or silica alone or in combination with each other or with other metal oxides such as thoria, zirconia, titania, chromia, molybdena, etc., contaminants in the hydrocarbon feedstocks which occur in the form of inorganic metal salts, e.g., halides and sulfates of sodium, caustics such as sodium hydroxide, and the like have been found to be objectionable for the reason that they tend to accumulate in the reactor, eventually increasing the back pressure in the reactor to the point where the reactor becomes plugged. It is also thought that the presence of these materials on the catalyst tends to decrease the activity of the catalyst and possibly its overall life, or both. In any regard, it has been definitely established that certain forms of organo-metallic compounds present in many hydrocarbon feeds, decompose upon contact with the catalyst such that the metal is deposited thereon to the detriment of the catalyst.

High metals content residua in particular, as contrasted with lower boiling hydrocarbon oils, produce a considerably greater amount of heavy metals deposition on the catalyst, thus causing increased catalyst deactivation, while extraneous solids and salts in the residua are the primary cause of plugging problems. Thus, though the contaminants exist in a number of forms, those which are known to cause catalyst deactivation are generally present as organo-metallic compounds of high molecular weight, e.g., metallic porphyrins and other organo-metallic complexes of nickel and vanadium; and those which create plugging problems are generally present as alkali metal salts, e.g., halides and sulfates of sodium. The latter as a source of contamination, can be removed by washing, adsorption and filtering to remove the salt from the oil. The decreased activity of the catalyst resulting from metal contamination and poisoning, fortunately the least prevalent of the two adverse reactions, however, is permanent and is overcome short term by increasing the severity of the reaction. The detrimental effects of either type of contamination upon catalyst activity is to be distinguished from the inactivating effect which is caused by the accumulation of carbonaceous deposits on the catalyst material. Thus, catalyst activity may be temporarily decreased by the formation of carbonaceous deposits on the catalyst surface during the reaction, but such deposits are readily removed by combustion in a regeneration operation as is generally practiced in the art. The accumulation of metal contaminants such as alkali metal salts on the catalyst, probably within the interstitial voids of the catalyst, is not permanently damaging to the catalyst, but these accumulations cannot be removed by simple regeneration and consequently such type of inactivation is considered quite troublesome. If precautionary measures are not taken to prevent the deposition of inorganic residues on the catalyst, it has been found that the back pressure in the catalytic reaction gradually increases during the course of the catalytic conversion process until the reactor becomes completely plugged after relatively short periods of time, for example, 20 to 50 days depending on the severity of the reactor conditions, the salt content of the feed, and the feed rate. Short periods of continuous operation obviously adversely affect the economics of the operation.

Various methods have been proposed for dealing with the inorganic metal salt contamination problem, including distilling the oil to separate its salt content, or washing the oil if the salt happens to be soluble in a desalting agent. The distillation of the hydrocarbon feedstock is a relatively effective way of separating the feedstock from most of its inorganic metal salt contaminants; however, distillation is a relatively costly procedure and adds considerably to the processing cost. Removal of the inorganic metal salt contaminants by washing is ordinarily limited to use of aqueous washing agents since other agents which might be effective would prohibitively increase the cost of processing of the hydrocarbon feedstock. Accordingly, the washing procedure is at best limited to the removal of soluble compounds, but washing methods in general do not remove all of such compounds from the feedstock.

An approach to the problem of reactor plugging due to the presence of inorganic metal salts, caustics and the like is based upon the finding that reactor plugging is substantially limited to the initial part of the main reaction zone. Thus, in a commercial reactor which may be, e.g., 100 to 200 feet in length, it has been found that the plugging is limited, e.g., to the first few feet of the reaction zone. The plug, which generally consists of carbonaceous and salt deposits combined with catalyst fines in the interstices of the catalyst bed substantially fills the voids between the catalyst particles in the first 0.5 to 3.0 feet of the reaction zone, with the void-fraction increasing rapidly thereafter so that the original void-fraction is substantially maintained beyond the first 5 feet of the reaction zone. In order to avoid the prohibitive cost of shutting down the reactor to remove the plugging metal contaminants from the initial section of the reaction zone, it is feasible to establish a "guard chamber" through which the hydrocarbon residuum feedstock can be passed prior to entry of the feedstock into the main reaction zone. The guard chamber, maintained under reaction temperature and pressure conditions, induces the formation of plugging deposits therein, thus lessening the amount of contamination in the reactor. Feedstock can thus be introduced into the main reaction zone without plugging the latter, even after long reaction periods since at least a major portion of the plug-forming components of the hydrocarbon residuum feedstock are deposited in the guard chamber. It has been found that by providing a plurality of guard chambers, in series and/or in parallel, a continuous stream of desalted feedstock can be obtained by cycling the contaminated feedstock to one guard chamber until it becomes plugged and then diverting the contaminated feedstock to another guard chamber until it becomes plugged and then diverting the contaminated feedstock to still another while the initial guard chambers are being unplugged. Thus, the guard chamber approach to removing such contaminants from residuum feedstocks prior to the introduction of the feedstock into a main reaction zone is considered a highly effective way of avoiding plugging and shutdown of large catalytic reactors.

In conventional petrochemical conversion, catalyst activity gradually diminishes during the conversion cycle, inter alia, due to formation of carbonaceous deposits upon the catalyst and to some extent due to catalyst poisoning. The latter results in very gradual, but permanent damage to the catalyst, but the former is temporary and, though quite acute, catalyst inactivity can be overcome by increasing the severity of the reaction. As the catalyst activity gradually decreases therefore, the reactor temperature must be gradually raised to compensate for catalyst activity loss. This is accomplished by introducing feed gases at a gradually increasing temperature level. Thus, the temperature of the reactor at end-of-run conditions is higher than at beginning-of-run conditions. After a period of time, in any event, loss of catalyst activity precludes efficient catalyst use and the catalyst must be regenerated. During regeneration, coke and other carbonaceous materials which gradually deposit on the catalyst and diminish its activity, are thus removed by any one of various methods, e.g., oxidation and/or steam treatment as is well known in the art. The regeneration can be performed in the same reactor, or in a reactor or zone separate from the reactor, and the regenerated catalyst then returned to the reactor, but in any event there must be a substantial time lapse before the reactor, in this case the guard chamber containing regenerated catalyst, is again put on stream. The start-up is again the relatively mild conditions, and then gradually, the severity is increased.

It follows that when hydrocarbon residuum feedstock is desalted by passage of the feedstock through a guard chamber prior to its introduction to the main reaction zone, the guard chamber becomes plugged and eventually the plugging deposits must be removed. Thus, on the one hand, each time a guard chamber becomes plugged it is necessary to bypass it so that it can be treated to unplug it; and this is certainly preferable to the alternative of dumping the entire reactor to clean up the catalyst. On the other hand, since the purpose of the guard chamber is to protect the reactor, an alternative of increasing the life of a guard chamber would appear detrimental to the former objective of increasing the productivity, or on-time of the reactor. But, guard chamber on-time is also important, and it is a worthwhile goal to increase guard chamber life if this can be done without sacrifice of reactor on-time. In other words, while it is desired to have the plugging occur in the guard chamber, if at all, it would also be desirable to reduce guard chamber plugging to a minimum rate consistent with substantially complete desalting of the feedstock to be introduced into the main reactor zone.

In regard to another aspect of the background of the invention, it is noted that petroleum crude oil generally contains relatively large and detrimental amounts of hydrocarbons containing heteroatoms such as sulfur, oxygen and nitrogen. In some cases, these heterohydrocarbons exist in such great quantities that the heteroatom content, i.e., non-hydrocarbon content, runs as high as about five percent by weight. The presence of such compounds is undesirable because of their adverse effect both upon subsequent hydrocarbon refining operations as well as upon fuel performance.

Various techniques have been developed to remove these heterohydrocarbons from hydrocarbon feedstocks. Generally, hydrorefining processes such as hydrodesulfurization are employed. In the hydrodesulfurization reaction, the hydrocarbon feedstock together with a hydrogen-containing gas such as hydrogen, town gas, coke oven gas, low temperature distillation gas, water gas, gases obtained from refining or reforming mineral oils or other liquid fuels, final or recycle gases from syntheses using hydrogen and the like is passed over or through a catalyst at a temperature ranging from about 650° F. to about 850° F., whereby sulfur and other heteroatoms are substantially completely removed from the hydrocarbon stream.

Water also can be injected into the hydrorefining reactor for the purpose of providing a control over the rate of temperature rise within the reactor.

SUMMARY OF THE INVENTION

It has now been found that a hydrorefining process, catalyst activity can be enhanced and catalyst plugging can be suppressed through the use of a slurry heat treater prior to the main hydrorefining reactor, and through the use of water injected between stages of the main reactor.

In accordance with the present invention, an improved catalytic hydrodesulfurization process is provided in which a sulfur-bearing hydrocarbon feed is admixed with hydrogen and brought into contact with a catalyst in a preliminary contact zone. The catalyst is maintained in the form of an oil slurry and the temperature in the preliminary contact zone is sufficient to produce substantial deposition of inorganic metal salts and some carbonaceous material on said catalyst.

The fluid hydrocarbon effluent is transferred from the preliminary contact zone to a multi-stage reaction zone wherein the hydrocarbon effluent is brought into contact with a catalyst. Hydrogen is also fed to the multi-stage reaction zone and water is injected between the stages of the multi-stage reaction zone to effect cooling of the reaction stream and to enhance catalyst activity.

The reaction products are separated in order to obtain a hydrocarbon stream exhibiting substantially reduced sulfur content.

BRIEF DESCRIPTION OF THE DRAWINGS

The foregoing objects as well as further objects will become more apparent from the following detailed description of the preferred embodiments of the present invention, with reference to the appended drawings wherein.

DETAILED DESCRIPTION OF THE INVENTION

Figure 1:
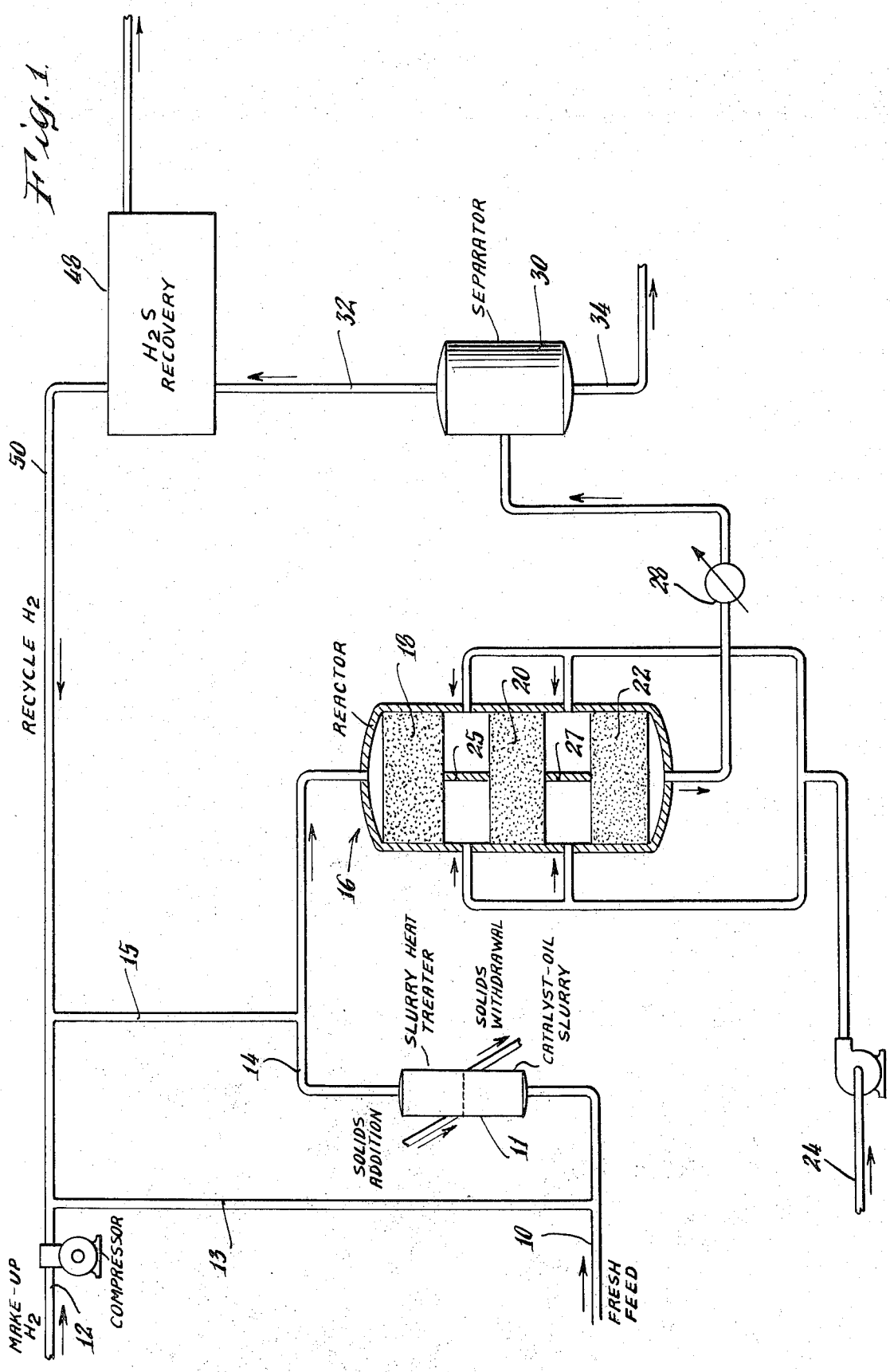
FIG. 1 is a simplified flow diagram of a hydrodesulfurization process in accordance with the present invention.

Referring now to the drawing, there is shown a sulfur-bearing hydrocarbon feed 10, illustrative of which is a virgin gas oil, or a catalytic cycle oil, petroleum residuum or the like being passed together with a hydrogen rich treat gas stream 13 to a slurry type of guard chamber or heat treater 11.

The slurry-heat treater 11 is a device of the type described in "Hydrocarbon Processing," September 1970, page 214, as a vapor/liquid system in which solid catalyst particles are maintained in a state of continuous random motion by upflow of the liquid phase. Further discussions of a slurry-reactor can be found in the paper entitled "Refinery Applications of the H-Oil Process," A. R. Johnson et al, Presented at 33rd Midyear Meeting of the American Petroleum Institute's Division of Refining, May 16, 1968, Philadelphia, Pennsylvania.

Further, and more detailed descriptions of the slurry-reaction system can be found in the following publications:

R. B. Galbreath and A. R. Johnson, "H-Oil Process is Proven by First Commercial Unit," Hydrocarbon Processing and Petroleum Refiner, 42, No. 9, 121–124 (September 1963);

M. C. Chervenak, C. A. Johnson, E. S. Johanson, S. C. Schuman, M. Sze, "H-Oil Process Primises to Improve Quality of Distillate Feed," Oil and Gas Journal, Aug. 29, 1960; and, M. C. Chervenak, C. A. Johnson, S. C. Schuman, "Hydrogenation by the H-Oil Process," Paper presented at 43rd National Metting AiCHE, Tulsa, Oklahoma (September 1960).

Hydrogen gas 12, is admixed with the hydrocarbon feed 10 and fed to the heat treater 11. The heat treater is operated at elevated temperatures in the range from at least 650° F. to 850° F., and preferably at even higher temperatures. Heat soaking or heat treating of the hydrocarbon feed is achieved, resulting in increased activity in the main hydrodesulfurization reactor 16. Holding time in the heat-treater 11, is from 10 minutes to approximately 60 minutes. The hydrogen flow to the heat treater is sufficient to give some hydrogenation activity.

The temperature within the heat treater can be at higher temperatures than could be achieved in accordance with the prior art, because deposition of carbonaceous material at high temperatures is not a problem in the slurry heat treater. The unit need not be shut down to replace or regenerate the catalyst, but rather the flowable catalyst can be withdrawn and added as required.

Furthermore, the temperature within the heat treater is uniform because of the flowing state of the catalyst.

It is desired to operate the heat treater at increased severity over what is possible with fixed bed reactors. Increased severity can be achieved by increasing temperatures, increasing ratios of catalyst to oil and decreasing space velocities. Therefore, the high temperature slurry heat treater can be operated at the desired high severity as compared to a fixed bed guard chamber.

The catalyst may vary in both physical forms and chemical composition depending upon the type of process in which the feedstock is to be employed. Silica and alumina based catalysts are widely employed for a variety of reactions. Silica based cracking catalysts including naturally occurring activated clays and synthetically prepared composites have been recognized as useful in promoting catalytic hydrocarbon reactions. Siliceous catalysts contain silica and frequently one or more promoting metal compounds such as one or more oxides or sulfides of a Group VI B metal (e.g., molybdenum or tungsten), either alone or in admixture with a Group VIII compound, specifically an oxide or sulfide of nickel or cobalt. Active catalysts are also obtained by depositing such Group VI B and/or Group VIII compounds on an alumina support or on a support comprising a combination of silica and alumina. Likewise other promoting oxides such as zirconia and magnesia may be employed in conjunction with a support containing silica and/or alumina. The catalyst may be in the form of beads, tablets or extruded pellets in various sizes depending upon the type of manipulative process to which it will be exposed.

The heat treater or guard chamber may contain the same catalyst as is used in the main reaction zone or another catalyst; or it may contain a particulate high surface area inert material such as bauxite, alpha alumina, activated carbon, silica gel, or the same catalyst support as is present in the main reactor without the reaction promoters deposited thereupon.

In the slurry treatment operation, metals from the hydrocarbon feed are deposited on the catalyst as are extraneous solids such as salt, which contribute to the plugging of a reactor. The catalyst is added and withdrawn periodically so that materials which cause plugging in a conventional fixed-bed reactor are removed prior to the main reactor 16.

The total catalyst employed in the heat treater 11, is generally less than about twenty percent, and most often is less than ten percent, of the weight of catalyst used in the main reactor, or reactors. Preferably from about five percent to about eight percent of the catalyst used in the main reactor, or reactors, is used in the heat treater. The depth of catalyst employed can range from about 5 to about 20 feet and preferably about 10 feet. The minimum depth required varies to some extent depending on the space velocity (LHSV) of the feed passing through the guard chamber, which ranges generally between about 1 V/Hr./V and about 10 V/Hr./V, and preferably between about 1 V/Hr./V and about 5 V/Hr./V. Space velocities within the guard chamber are usually maintained above those employed in the main reactor, which ranges from about 10 percent to about 40 percent of those employed in a guard chamber.

The superficial liquid mass velocity through a guard chamber ranges generally from about 500 lbs./hr./ft.$^2$ to about 5,000 lbs./hr./ft.$^2$, and preferably from about 2,000 lbs./hr./ft.$^2$ to about 3,000 lbs./hr./ft.$^2$ of guard chamber cross-section.

Generally, the contaminated catalysts of the guard chamber are discarded. However, the removal of the inorganic metal salts which plug the guard chamber can be effected, if desired, by any one of various methods depending upon the nature of the metal contaminants. One method by which the catalyst material of the guard chamber may be cleaned of plugging deposits, is simply by washing, but a more effective method is to first contact the contaminated material with an oxygen-containing gas stream, such as air or a dilute stream of oxygen, at a moderately elevated temperature. The oxygen treatment has the effect of removing combustible carbonaceous deposits as well as converting insoluble metal salts, especially those in the form of sulfides, to dispersible forms of the metal contaminant, such as sulfates. The oxidation step can then be followed by washing the solubilized contaminants with an aqueous medium. To remove soluble nonvolatile salts such as sodium chloride deposits, or sulfates, the aqueous medium can be simply water. In the event that the materials are less soluble than salt, it may be desirable to use a slightly alkaline washing medium. Alternatively rather than oxidizing the removed catalyst material of the guard chamber prior to washing, other conventional methods for removing carbonaceous material such as steam gasification can be used.

The slurry heat treater is seen to provide numerous advantages over fixed bed reactors. For example, catalyst can be added and withdrawn while the unit is operating. In the ebullated state, the catalyst behaves very much as in a gas solid fluidized bed, and can be made to flow into and out of a reactor. Catalyst activity can thus be maintained at a steady, desired level by controlling the rate of catalyst addition. Even when processing high metal content stocks, the process will operate continuously without downtime for replacement or regeneration of catalyst.

The reactor is maintained in the ebullated state by recycling liquid from the top of the reactor to the bottom thereby creating an isothermal system. This eliminates the need for costly and elaborate temperature control systems for the heat treater. The low pressure drop associated with the oil slurry-catalyst system permits the use of smaller catalyst sizes than is practical in fixed bed systems. The 1/32 in. particle size catalyst which can be used in the slurry heat treater, is considerably more effective than the larger particle size catalyst which must be used in fixed bed reactors.

The effluent stream 14 from the heat treater 11, is mixed with a hydrogen feedstream 15, and the admixture is fed downwardly through a multiple fixed bed reactor shown generally as 16. The several beds of the reactor designated representatively as 18, 20 and 22 respectively are comprised of a Group VI B and/or Group VIII metal. The catalysts are generally supported on an inorganic oxide base as for example, alumina stabilized with silica. A preferred catalyst is a mixture of cobalt or nickel and molybdenum supported on a silica stabilized alumina support. The catalyst can be presulfided in conventional manner either in situ or ex situ. These several catalyst beds within the reactor are separated one from the other and a quench stream 24 of water or steam or, if desired, hydrogen alone or as recycle gas, alone or in mixture with the water, is fed into the spaces between the beds and can be, if desired, directed against impingement baffles 25 and 27 in said spaces to assure even distribution of the quench stream over the catalyst bed.

In the hydrodesulfurization process, a large quantity of heat is released as a result of the exothermic reactions which occur. If this heat is not removed from the system, the reactor temperature can rise to a point where a significant cracking of the hydrocarbon stream and catalyst deactivation occur. Heretofore in an attempt to avoid these problems, cold quench gas, e.g., recycle gas, was injected between the catalyst beds to reduce the reactor temperature. This procedure was found expensive since the gas must be cooled, separated from the liquid, scrubbed to remove contaminants and recompressed before being injected into the reactor. It is considered preferable in the present process to employ liquid water as the cooling medium. The heat absorbed by the latent heat of vaporization of the water supplies the necessary cooling. The resulting steam has been found to increase catalyst activity. Generally from about 5 to about 50 percent by volume water can be employed to obtain the desired degree of heat removal. It has been found that this amount of water can raise catalyst activity 25 to about 50 percent.

The effluent from reactor 16 is partially cooled in cooling device 28 and passed to a high temperature, high pressure separator 30 wherein hydrogen, hydrogen sulfide and light ends are removed via line 32 and the desulfurized oil and water are removed via line 34.

The gaseous effluent from the separator 30 is fed via line 32 to a hydrogen sulfide recovery unit 48, wherein the hydrogen sulfide is removed. The effluent from the recovery unit 48 is recycled via line 50 with make-up hydrogen from line 12, to form hydrogen rich treat gas which is passed via line 12 to the heat treater 11, and via line 15, to the main reactor 16.

The reactor conditions which are maintained in the main reactor 16 for efficient hydrodesulfurization generally require the reactor to be run at a pressure ranging from about 300 to about 3,000 psig. Preferably, however, the pressure is maintained within the reactor at from about 500 to about a 1,000 psig. The temperature within the reactor varies from the start of the run to the end of the run, generally ranging from about 650° F. to about 800° F. at the start of the run to about 850° F. at the end of the run. Preferably, however, the temperature within the reactor at the start of the run ranges from about 675° F. to about 710° F. rising to about 765° F. at the end of the run. Although lower or higher temperatures can be employed, it has been found that most economical operation dictates a temperature of around about 765° F. at the end of the run. The liquid hourly space velocity (LHSV) of the reactants within the reactor ranges from about 0.1 to about 10 and preferably ranges from about 0.5 to about 2. The composition of the hydrogen rich treat gas fed to the reactor, including both recycle and makeup hydrogen, generally ranges from about 50 to about 90% by volume of hydrogen, and preferably ranges from about 60 to about 80% hydrogen by volume. On a volume basis, from about 5 to about 50% water can be added to the reactor. Preferably, from about 10 to about 30% water can be added and has been found to effectively cool and yet increase catalyst activity. Although it is considered preferable to inject liquid water, it is equally possible to inject steam directly into the system and still obtain the benefits of increased catalyst activity.

Catalyst deactivation has heretofore been offset to an extent by periodically increasing the reactor temperature. The addition of water or steam has been found to offset catalyst deactivation at constant temperature. Thus, catalyst life can be significantly extended by combining water or steam injection with periodic increases in reactor temperature. When the temperature is increased, the steam addition can be reduced to a lower level and then gradually increased until the maximum steam addition is reached. Then the temperature can be raised and the cycle repeated again. In this manner, catalyst life can be significantly extended. It is also considered preferable when using either water or steam to condense the resulting steam and recover the water for cycling back to the reactor. If desired, instead of condensing the steam for recycle to the water quench sprays of the reactor, the steam can be condensed in a clean boiler to produce low pressure, i.e., about 125 psig. steam.

Figure 2:
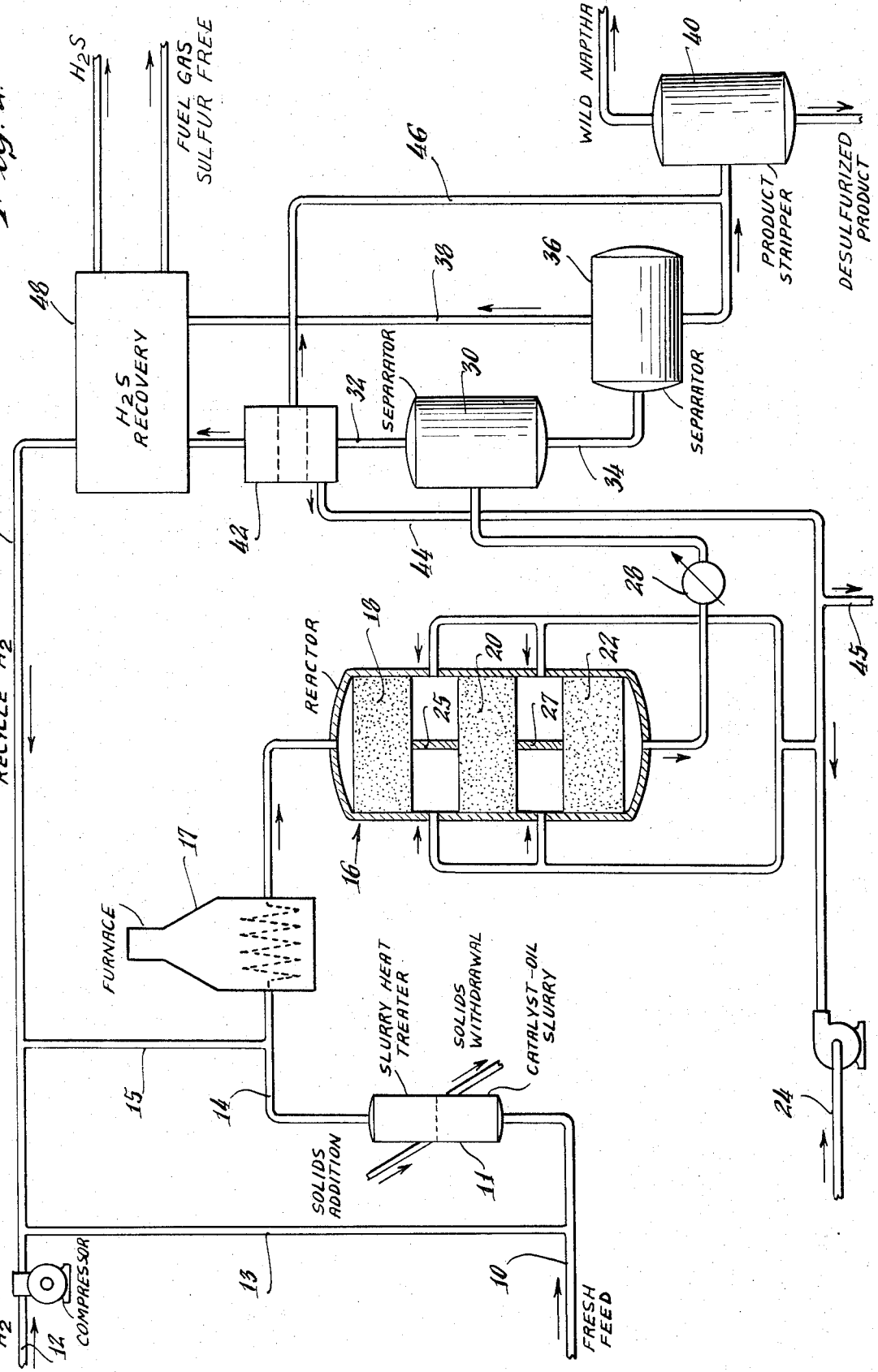
FIG. 2 is a simplified flow diagram of a modification of the hydrodesulfurization process of FIG. 1.

The process may be modified, as for example, in the manner illustrated in FIG. 2.

It is therein shown that the combined feed streams 14 and 15 are passed through a preheat furnace 17 before being charged to the reactor 16. This permits the slurry-heat treater to be operated at a temperature substantially below that of the reactor 16.

Figure 3:
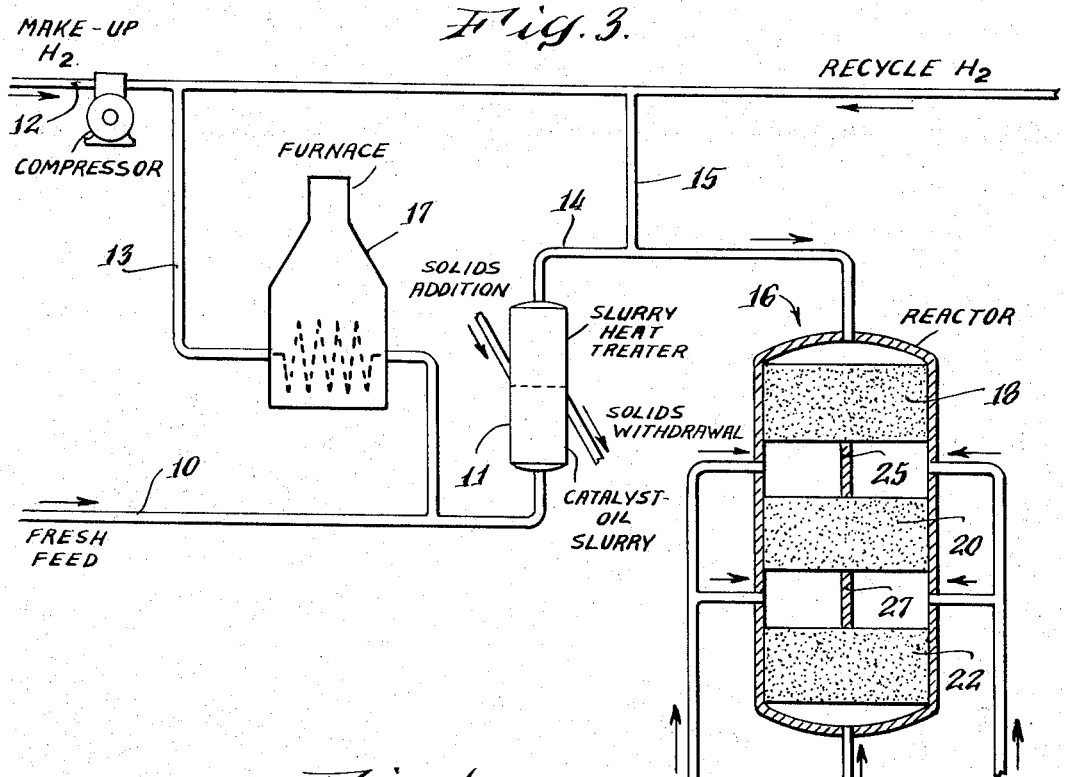
FIG. 3 is a further modification, in simplified form, of the hydrodesulfurization process of FIG. 1; and, FIG. 4 is still further modification in simplified form, of the hydrodesulfurization process of FIG. 1.

However, as shown in FIG. 3, in order to achieve an operating temperature in excess of 850° F. in the heat treater 11, the furnace is advantageously employed to preheat the hydrogen feed stream 13 before admixture with the hydrocarbon feed stream 10. Then, the combined streams are fed to the heat treater 11.

In FIG. 2, it is shown that the desulfurized oil from the separator 30 is removed via line 34 and fed to a high temperature-low pressure separator 36 and then passed to stripper 40 wherein steam is injected for further separation of hydrogen sulfide and wild naphtha. The finished desulfurized oil product is removed as a bottoms product from the stripper.

The gaseous effluent from the high temperature-high pressure separator 30, i.e., hydrogen, hydrogen sulfide and light ends, is fed via line 32 to a high pressure, cold separator and water disengaging drum 42 wherein the steam is condensed and recycled via line 44 to the reactor. A portion of the recycle quench stream can be withdrawn at line 45 and sent to a blowdown tank (not shown). Any entrained hydrocarbons can be separated within drum 42 and passed via line 46 to the stripper 40. The vaporous effluent from drum 42 is fed to a hydrogen sulfide recovery unit 48 wherein the hydrogen sulfide is removed by contact with a caustic scrubbing agent such as methylethylamine. The effluent from the scrubber, chiefly hydrogen and light ends, is recycled via line 50 with makeup hydrogen from line 12 to form the hydrogen rich treat gas which is passed via line 13 into admixture with the fresh feed and then sent to the reactor. A sulfur free fuel gas stream is also recovered. Thus, the product from the process of the present invention are: (1) essentially 100 liquid volume percent of the feed as desulfurized product, (2) a hydrogen sulfide stream of 95+% purity, (3) wild naphtha containing less than about 0.1 weight % sulfur, and (4) a sulfur free fuel gas.

Figure 4:
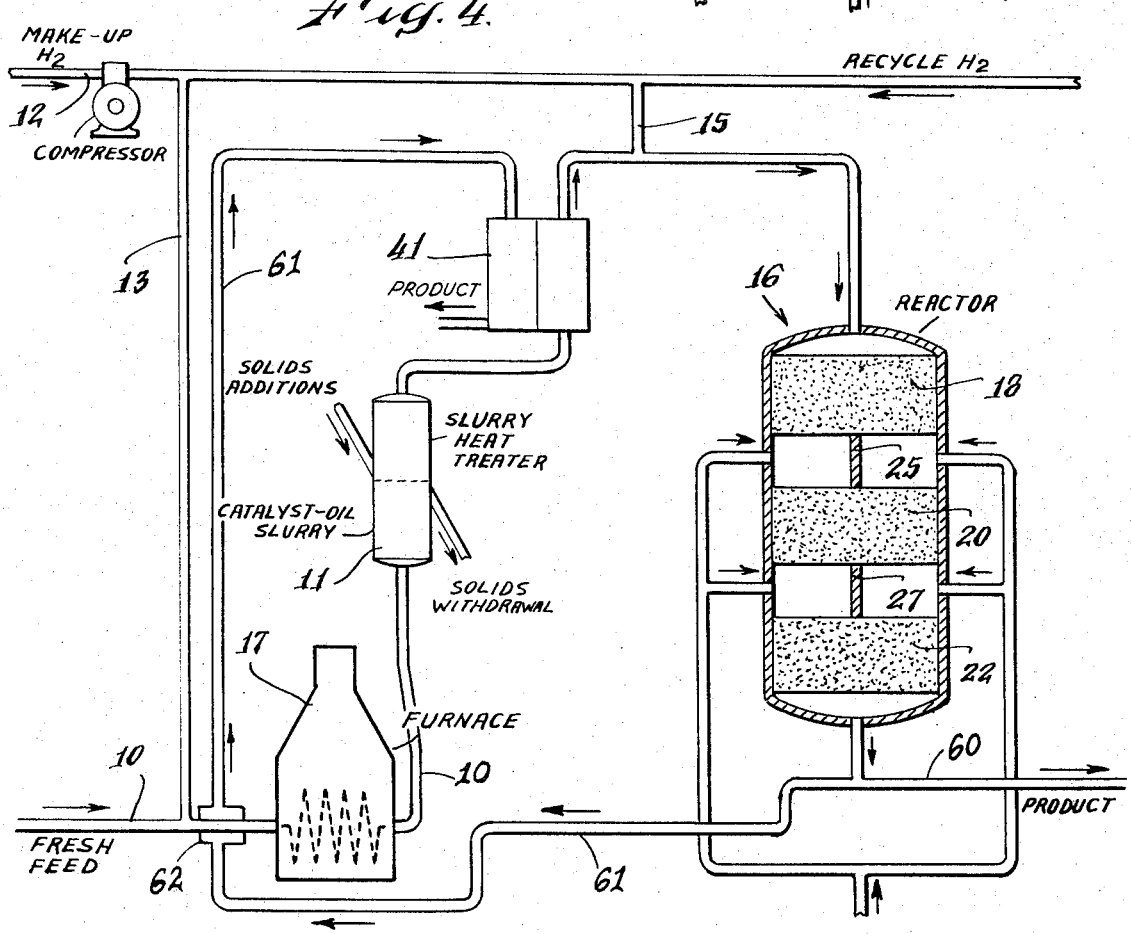

As illustrated in the modification of FIG. 4, a portion of the effluent from the reactor 16 can be passed in heat exchange relationship in heat exchangers 41, 62 with the entering feed and effluent from the slurry-heat treater 11, thus providing a preheating of the feed to the slurry-heat treater 11, and consequently providing a temperature control for lowering the reaction temperature within the main reactor 16 below that value at which the slurry heat treater is operated.

The fresh feed in line 10, after heat exchange in heat exchanger 62, is passed through the furnace 17 and then into the slurry heat treater 11. The feed, after passage through the slurry heat treater 11, is combined with a portion of recycle hydrogen, and make-up hydrogen, and fed into the reactor 16. A portion of the product is discharged from the reactor 16 via line 60 and another portion, as suggested, is passed in heat exchange relationship withthe fresh feed and with the effluent from the slurry heat treater 11 via heat exchangers 41,62.

The process as shown in FIG. 4 provides for a high temperature in the slurry-heat treater 11, and a low temperature in the reactor 16 since the feed to the slurry-heat treater is preheated fresh feed and effluent from the slurry heat treater is passed in heat exchange with cooled product from the reactor. The system of FIG. 4 thus provides for operation of the slurry-heat treater at a temperature close to or even higher than the temperature in the reactor 16, whereas in the previously described systems, the reactor 16 may be maintained at a high temperature relative to the slurry-heat treater.

It is thus seen that temperature control within the heat treater and the main reactor can be achieved in a variety of ways. The various possibilities include the use of a preheater furnace to heat the hydrogen and/or the hydrocarbon feed to the heater treater or to the main reactor.

The following is exemplary of the results obtained in treating a feedstock by passage of said feedstock, with hydrogen, through a slurry-heat treater prior to hydrodesulfurization of the feedstock in a main hydrodesulfurization reactor. The catalyst employed in the heat treater and main reactor consists of cobalt molybdate on alumina and it is one having a surface area of 315 meters per gram, a pore volume of 51 cc per gram, and a surface area in 70 A. diameter pores of 270 square meters per gram.

The conditions of operation of the guard chambers and reactor are as follows:

|  | Guard Chamber | Hydrodesulfurization Reactor |
|---|---|---|
| E.I.T. Temp., °F. | 770 | 680 |
| Pressure, psig | 1000 | 985 |
| Inlet Gas, SCFB | 3000 | 3000 |
| % Hydrogen | 100 | 100 |
| Feed Rate, V/Hr./V | 1.4 | 0.35 |

The composition of the feedstock entering and leaving the guard chambers, and resultant product from the reactor, are given as follows:

|  | Feed | Guard Chamber Effluent | Hydrosulfurization Product |
|---|---|---|---|
| API | 14.5 | 16.5 | 21.4 |
| Sulfur, Wt. % | 3.92 | 3.64 | 1.22 |
| Metals (V & Ni), ppm | 99 | 90 | 62 |
| Viscosity (SSFD122) | 247 | 56 | 27 |
| D1160 °F. |  |  |  |
| IBP | 451 | 451 | 334 |
| 10 | 627 | 573 | 532 |
| 40 | 809 | 724 | 774 |
| 50 | 875 | 811 | 843 |

What is claimed is:

1. An improved catalytic hydrodesulfurization process for converting a hydrocarbon residuum feed to useful products in a main hydrodesulfurization reaction zone comprising:

introducing a sulfur-bearing high metals content hydrocarbon residuum and hydrogen into a preliminary contact zone which contains an oil-slurry of an active catalyst of a Group VI-B or VIII metal compound, deposited on an alumina support, the catalyst being contained in said preliminary contact zone in concentration less than 20 percent of the weight concentration of catalyst contained in said main hydrodesulfurization zone, said contact being conducted at a temperature ranging from about 650° F. to about 850° F., at a contact time ranging from about 10 to about 60 minutes, and at superficial liquid mass velocity ranging from about 500 lbs./hr./ft.$^2$ to about 5,000 lbs./hr./ft.$^2$ of contact zone cross-section sufficient to produce substantial deposition of inorganic salts and carbonaceous materials upon said catalyst but insufficient to produce significant conversion of the residuum feed;

transferring the hydrocarbon residuum effluent from said preliminary contact zone to the main hydrodesulfurization reaction zone which contains a plurality of fixed beds of a hydrodesulfurization catalyst comprising an active catalyst of a Group VI-B or VIII metal compound, deposited on an alumina support, contacting said residuum with said catalyst and with hydrogen to effect hydrodesulfurization, injecting water between said beds to effect cooling of the reaction and to enhance catalytic activity, and then separating the reaction effluent from said hydrodesulfurization zone to obtain said useful products exhibiting substantially reduced sulfur content.

2. The process of claim 1 wherein said catalyst employed in said preliminary contact zone comprises a combination of oxides and/or sulfides of molybdenum or tungsten with oxides and/or sulfides of nickel or cobalt.

3. The process of claim 1 wherein said residuum is a petroleum residuum obtained by the atmospheric distillation of oil, said residuum containing a relatively large amount of sulfur, asphaltenes, metals and ash.

4. The process of claim 1 wherein the catalyst employed in said preliminary contact zone comprises a combination of oxides and/or sulfides of molybdenum or tungsten with oxides and/or sulfides of nickel or cobalt.

5. The process of claim 4 wherein the catalyst comprises 5 to 25 weight percent of a sulfide of tungsten or molybdenum and 1 to 15 weight percent of a sulfide of nickel or cobalt deposited on an alumina support.

6. The process of claim 5 wherein the support contains 1 to 6 weight percent of silica.

7. The process of claim 1, wherein a portion of the vaporous effluent from the main hydrodesulfurization reaction zone is admixed with the said admixture of residuum and hydrogen prior to the introduction of said admixture to said preliminary contact zone to form a combined preliminary contact zone feed, and the hydrocarbon effluent from said main reaction zone is passed in heat exchange with said combined preliminary contact zone feed thereby preheating said combined feed.

8. The process of claim 7, wherein said admixture is heated prior to being admixed with said vaporous effluent from the main hydrodesulfurization reaction zone.

9. The process of claim 1 wherein the amount of catalyst maintained in the preliminary contact zone is less than 10 percent of the weight percent concentration of catalyst contained in the main reaction zone.

10. The process of claim 9 wherein the weight percent concentration of catalyst in the preliminary contact zone ranges from about 5 to about 8 percent of that contained in the main reaction zone.

11. The process of claim 9 wherein the superficial liquid mass flow velocity through the main reaction zone ranges from about 2,000 lbs./hr./ft.$^2$ to about 3,000 lbs./hr./ft.$^2$ of contact zone cross-section.

12. The process of claim 9 wherein the space velocity (LHSV) of the hydrocarbon residuum feed passing through the preliminary contact zone ranges from about 1 V/Hr./V to about 10 V/Hr./V, and the space velocity (LHSV) of the hydrocarbon residua effluent through the main reaction zone ranges from about 10 to about 40 percent of that employed in the preliminary contact zone.

13. The process of claim 9 wherein the particle size of the catalyst maintained in said preliminary contact zone is about 1/32 inch particle size diameter.

* * * * *